United States Patent
Clark et al.

(10) Patent No.: US 9,422,496 B2
(45) Date of Patent: Aug. 23, 2016

(54) OXYGEN AND SULFUR TOLERANT ADSORBENT SYSTEM

(71) Applicant: UOP LLC, Des Plaines, IL (US)

(72) Inventors: Keith R. Clark, Santa Fe, NM (US); Christopher B. McIlroy, Park Ridge, IL (US); Michael E. Clark, Sugar Land, TX (US); Ali Hatami, Missouri City, TX (US); Shain-Jer Doong, Kildeer, IL (US)

(73) Assignee: UOP LLC, Des Plaines, IL (US)

( * ) Notice: Subject to any disclaimer, the term of this patent is extended or adjusted under 35 U.S.C. 154(b) by 100 days.

(21) Appl. No.: 14/552,693

(22) Filed: Nov. 25, 2014

(65) Prior Publication Data

US 2016/0145518 A1    May 26, 2016

(51) Int. Cl.
    *B01D 53/04* (2006.01)
    *C10L 3/10* (2006.01)

(52) U.S. Cl.
    CPC .............. *C10L 3/106* (2013.01); *B01D 53/0407* (2013.01); *B01D 53/0438* (2013.01); *B01D 53/0462* (2013.01); *C10L 3/101* (2013.01); *C10L 3/103* (2013.01); *B01D 2253/116* (2013.01); *B01D 2253/1124* (2013.01); *B01D 2256/24* (2013.01); *B01D 2257/104* (2013.01); *B01D 2257/30* (2013.01); *B01D 2257/602* (2013.01); *B01D 2257/702* (2013.01); *B01D 2257/80* (2013.01); *B01D 2259/403* (2013.01); *B01D 2259/4009* (2013.01); *C10L 2290/08* (2013.01); *C10L 2290/12* (2013.01); *C10L 2290/542* (2013.01)

(58) Field of Classification Search
    CPC ........... B01D 53/0407; B01D 53/0438; B01D 53/0462; B01D 2253/1124; B01D 2253/116; B01D 2256/24; B01D 2256/245; B01D 2257/104; B01D 2257/30; B01D 2257/602; B01D 2257/702; B01D 2257/80; B01D 2259/4009; B01D 2259/403; C10L 3/106; C10L 3/101; C10L 3/103; C10L 2290/08; C10L 2290/12; C10L 2290/542
    USPC ........... 95/114, 115, 117, 121, 122, 123, 125, 95/134–138, 143; 423/244.01, 244.02; 585/802, 820; 208/208 R
    See application file for complete search history.

(56) References Cited

U.S. PATENT DOCUMENTS

| | | | | |
|---|---|---|---|---|
| 3,890,120 A | * | 6/1975 | Guyot | B01D 53/52 95/136 |
| 8,133,302 B2 | * | 3/2012 | Northrop | C10G 70/046 208/208 R |
| 8,158,843 B2 | * | 4/2012 | Song | C10G 25/003 208/244 |
| 8,940,263 B2 | * | 1/2015 | Golden | B01D 53/864 423/247 |

(Continued)

OTHER PUBLICATIONS

Search Report dated Feb. 4, 2016 for corresponding PCT Appl. No. PCT/US2015/061225.

*Primary Examiner* — Frank Lawrence

(57) ABSTRACT

A process for treating a gas stream, such as natural gas, comprising a process design that prevents the formation of undesired sulfur and sulfates from the reaction of oxygen and sulfur is disclosed. After water is removed from the gas stream, a portion of the dried gas stream is sent through a cooled adsorbent bed that has a first layer to remove sulfur compounds and then a layer to remove oxygen. There may be additional layers of adsorbent to remove other contaminants. The gas stream that is then heated to regenerate an adsorbent bed no longer contains sulfur and oxygen and undesirable reactions of sulfur and oxygen are avoided.

14 Claims, 1 Drawing Sheet

(56) References Cited

U.S. PATENT DOCUMENTS

2010/0121126 A1    5/2010   Northrop et al.
2014/0224118 A1    8/2014   Zhou et al.
2014/0357926 A1*   12/2014   Doong ............... C07C 7/005
                                                                                                       585/802

* cited by examiner

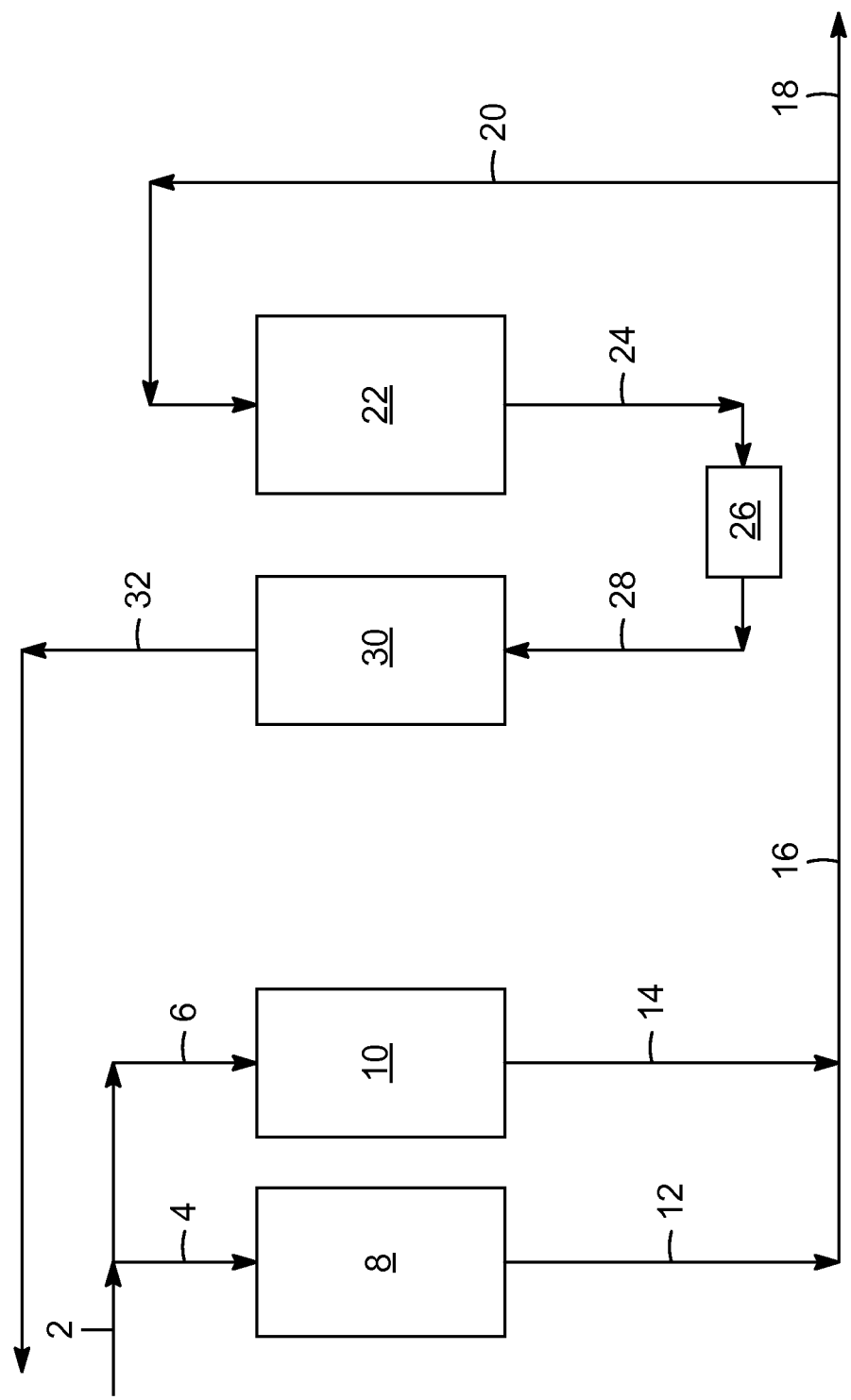

OXYGEN AND SULFUR TOLERANT ADSORBENT SYSTEM

BACKGROUND OF THE INVENTION

Liquefied natural gas (LNG) is natural gas, primarily methane, that has been converted to liquid form for ease of storage or transport. The liquefaction gas pretreatment process involves removal of certain components such as acid gases, mercury, water and heavier hydrocarbons. The natural gas is condensed into a liquid at close to atmospheric pressure by cooling it to about −162° C. Specially designed ships are used for the shipment of LNG over routes where pipelines do not exist to transport the natural gas in liquid form. Due to the abundance of natural gas in North America there is a shift occurring from importing LNG to exploring the option of exporting LNG. A network of natural gas pipelines exist to supply feed gas to an LNG plant. It has been found that the pipeline feed gas may contain oxygen and various sulfur contaminants which can cause operating issues for adsorbent based systems such as a molecular sieve dehydration unit.

In an adsorbent based system if oxygen is present with sulfur compounds in the regeneration gas the oxygen and sulfur can react during the heating and cooling steps forming elemental sulfur and sulfates. Sulfates block the molecular sieve pores and permanently deactivate the adsorbent resulting in short bed life. Additionally, elemental sulfur may be formed that can plug passages of the regeneration gas cooler or other equipment and lead to fouling and poor performance.

Natural gas is dehydrated in adsorbent beds for the purpose of protecting the downstream cryogenic LNG plant from hydrate formation. In a conventional prior art design, water is removed in a first adsorbent bed resulting in a dry product stream. Then a slip stream of product gas is first heated and sent to regenerate an adsorbent bed and produce a gas which contains desorbed impurities including water. The water may be removed from this gas stream by being sent through a cooler to condense water then to a knock out drum for vapor liquid separation. The gas can be recycled back to be combined with the wet feed that is sent through the first adsorbent bed.

It has been found that operation of thermally regenerated adsorbent based dehydration units in the presence of oxygen and sulfur compounds resulted in formation of elemental sulfur and sulfur compounds during the regeneration step. The sulfur rapidly accumulated on the molecular sieve bed, and caused an accelerated loss of dehydration capacity, necessitating replacement of the molecular sieve within a matter of months. This failure involving the formation of sulfur and sulfates was found to occur despite attempts to modify conventional designs through the use of an adsorbent having a lower regeneration temperature based upon the assumption that such lower regeneration temperatures would be adequate to prevent the reaction of oxygen and sulfur to produce elemental sulfur and sulfates. In the present invention, a process design has been developed that prevents the formation of undesired sulfur and sulfates from the reaction of oxygen and sulfur.

SUMMARY OF THE INVENTION

The invention involves a process for treating a gas stream comprising passing a gas stream through at least one adsorbent bed to remove water and producing a dried gas stream, and then sending a portion of the dried gas stream to a cooled adsorbent bed containing a first layer of adsorbent to remove sulfur compounds and then sending the dried gas stream to a second layer of adsorbent to remove oxygen and oxygen compounds. The gas stream will usually be natural gas which has first been treated to remove acid gases. There is at least one adsorbent bed in adsorption to remove water. The dried gas stream passes through the cooled adsorbent bed, a gas stream exits the cooled adsorbent bed and is first heated and then passes through an adsorbent bed to heat the adsorbent bed and remove contaminants from the heated adsorbent bed. The heated gas stream exits the adsorbent bed and is then recycled to the upstream acid gas removal unit. Alternatively, the gas can be recycled back to be combined with the wet feed that is sent though the first adsorbent bed.

The cooled adsorbent bed may further comprise a layer of adsorbent to remove water or mercury as well as additional layers to remove heavy hydrocarbons such as hexane, heptane, benzene, etc. The first layer of adsorbent to remove sulfur compounds comprises an adsorbent selected from molecular sieves. The layer of adsorbent to remove oxygen may comprise a reduced metal oxide adsorbent. Generally, the dried gas stream comprises less than about 20 ppmv each of oxygen and sulfur.

BRIEF DESCRIPTION OF THE DRAWING

The FIGURE shows a flow scheme for the oxygen and sulfur tolerant system of the invention.

DETAILED DESCRIPTION OF THE INVENTION

Due to the recently discovered issue regarding the reaction of oxygen and sulfur compounds during regeneration of the adsorbent beds, there is a need to modify adsorbent systems to prevent the formation of elemental sulfur and sulfates that damage the adsorbent beds. Natural gas dehydration systems in LNG application therefore need to be designed to accommodate the presence of even low levels of oxygen and sulfur compounds. As a result, the process design of the present invention is able to tolerate the presence of low levels of oxygen and sulfur compounds by adsorbing these contaminants from the regeneration gas while simultaneously cooling the bed.

The invention is a process design scheme requiring several layers of adsorbent products which can vary on a case by case basis depending on the contaminants found in the gas stream. As illustrated in the FIGURE, regeneration is conducted by using a slip stream of dried product which contains a low level of oxygen and sulfur compounds (typically less than 20 ppmv of each). In an embodiment of the present invention that employs four adsorbent beds, the fourth bed is employed as a guard bed and used to remove oxygen and sulfur reactive contaminants at the cooling step before gas is passed through a heater and enters an adsorbent bed that is at an elevated temperature where the adverse reactions would occur if the reactive contaminants had not been removed.

In an embodiment of the invention several different layers of adsorbent products are used (based on the type and level of contaminants in the stream). Typically a molecular sieve product with larger pore openings is located at the very top of the cooling bed to remove sulfur compounds (RSH, $H_2S$, etc) from the regeneration gas, thus preventing sulfur (other than what is already co-adsorbed during adsorption step) from entering the heating bed. This layer is normally followed by the water/mercury (if required) removal layers. And finally, a metal oxide type product (preferably in reduced form) is used at the very bottom of the bed to ensure complete removal of oxygen.

As a result of this system (which in the embodiment shown herein is fully regenerable), the molecular sieve bed will last enough to meet the typical turn around schedule at LNG plants of three to four years.

In an embodiment of the invention, there are four molecular sieve adsorber beds in the unit. Under normal operation, two of the adsorber vessels are processing natural gas for removal of water while the other two are going through a series of steps for thermal regeneration to desorb the water which was loaded during the previous adsorption step. A typical adsorption and regeneration step timing is given in the table below.

TABLE

UOP Molecular Sieve Unit - Step Times

| Adsorber | Step 1<br>0 to 9 hrs | Step 2<br>9 to 18 hrs | Step 3<br>18 to 27 hrs | Step 4<br>27 to 36 hrs |
|---|---|---|---|---|
| A | Adsorption | Heating | Cooling | Adsorption |
| B | Adsorption | Adsorption | Heating | Cooling |
| C | Cooling | Adsorption | Adsorption | Heating |
| D | Heating | Cooling | Adsorption | Adsorption |

Feed gas to the molecular sieve unit that is the subject of the present invention is typically product gas from an upstream amine unit that has removed acid gases. Prior to entering the molecular sieve adsorbers, the feed is cooled and bulk liquid vapor separation occurs in a knock out drum. The feed gas then enters a filter coalescer to remove any entrained liquids or aerosols.

The feed gas passes downward through two adsorbers operating in parallel. Each externally insulated adsorber contains adsorbents to remove water such as zeolite 4A. Treated gas meeting product specification exits the bottom of the adsorbers and passes through one of the two parallel particle filters. The spared particle filters remove potential entrained particulate matter greater than 10 microns and allow for continuous operation when one filter unit is bypassed.

As shown in above table, each bed switches from adsorption position to heating position and then to a cooling position in the adsorption cycle. Immediately following completion of the bed heating (regeneration) step, the hot bed is switched to the cooling position before it returns to adsorption service. Cooling is accomplished using a slipstream of dried gas exiting the bed(s) in the adsorption position, which contain the reactive contaminants (oxygen and sulfur compounds) as these are not entirely removed during the adsorption step with typically about 5 to 15 ppm of the sulfur compounds and the full 20 ppmv of oxygen remaining. Even these relatively low concentrations may result in significant damage to the adsorbent beds during the regeneration cycle. The gas is introduced through a flow control valve and flows downward to cool the adsorber.

Shortly after the start of cooling, a heat transfer (cooling) velocity front is quickly established within the bed, with that portion of the bed behind the front being cool and thus able to adsorb sulfur compounds with an appropriately selected adsorbent to maximize sulfur removal. A layer of adsorbent at the top of the cooling bed removes trace sulfur from the cooling gas to prevent unwanted reactions with oxygen during the regeneration cooling and heating steps. Sulfur adsorbed during the cooling step will be released into the product gas upon entering the following adsorption step.

At the start of the cooling step while the bed is hot, oxygen will combust with hydrocarbons generating water and $CO_2$. As the bed cools this reaction will stop and oxygen will be removed at the bottom of the cooling bed by the layer of copper oxide adsorbent which removes oxygen by the following reaction:

$$Cu + \tfrac{1}{2}O_2 \rightarrow CuO$$

The layer of copper oxide adsorbent prevents any oxygen from entering the heating vessel. As the adsorber cools, the gas temperature will drop to approximately the same temperature as the feed. Additional layers of adsorbent may be used to remove other contaminants that may be present.

Oxygen and sulfur free gas exiting the cooling adsorber flows to the regeneration gas heater which raises the gas temperature to about 288° C. (550° F.). The hot gas travels to the bottom of the adsorber which has just completed the adsorption step. As the adsorber heats up, the adsorbed water is desorbed into the regeneration gas. At this step all of the sulfur compounds (RSH, $H_2S$, COS) which were co-adsorbed during the adsorption step, will also get desorbed from the bed and since the gas is free of $O_2$, there will be no adverse reaction at the high temperature of heating step. Also during the heating step the copper oxide adsorbent is reduced (regenerated) by hydrocarbons contained in the regeneration gas. Assuming butane the reaction is as follows:

$$13\ CuO + C_4H_{10} \rightarrow 13\ Cu + 5\ H_2O + 4\ CO_2$$

The adsorbent bed will be reduced (regenerated) before the bed switches to the cooling step when $O_2$ removal is required. The spent regeneration gas is cooled in the Regeneration Gas Cooler and any liquids collected in the Regeneration Gas Separator. Vapor from the Regeneration Gas Separator is compressed and recycled to the upstream acid gas removal unit or alternate destination.

The FIGURE shows a four adsorbent bed oxygen tolerant dehydrator design of the present invention that avoids the formation of undesirable sulfur compounds which can occur even in natural gas streams containing low levels (20 ppmv maximum) each of oxygen and sulfur. In the FIGURE, a wet feed gas 2 is sent from an acid gas removal unit (AGRU—not shown) and is divided into streams 4 and 6 which enter adsorbent beds 8 and 10, respectively. Adsorbent beds 8 and 10 contain an adsorbent such as a 4A zeolite that is effective at dehydrating the gas stream. Dried gas streams 12 and 14 exit adsorbent beds 8 and 10, respectively and are shown as combined into product gas stream 16 which is sent for liquefaction as gas stream 18. A portion of gas stream 16 is diverted as a slip stream to be used to regenerate the adsorbent beds. Slip stream 20 is used as a regeneration stream and is sent through adsorbent bed 22 which in one embodiment will have three layers of adsorbent. Slip stream 20 first passes through a layer of adsorbent to remove sulfur compounds such as hydrogen sulfide and other sulfur compounds. Then the slip stream passes through a middle layer for removal of water and mercury. Finally, the slip stream passes through a third layer for removal of oxygen. A purified gas stream 24 is heated by a heater 26 and a heated regeneration stream 28 passes through adsorbent bed 30 to remove water and other impurities. A spent regeneration gas 32 is then recycled to the acid gas removal unit.

SPECIFIC EMBODIMENTS

While the following is described in conjunction with specific embodiments, it will be understood that this description is intended to illustrate and not limit the scope of the preceding description and the appended claims.

A first embodiment of the invention is a process for treating a gas stream comprising (a) passing a gas stream through at least one adsorbent bed to remove water and producing a dried gas stream, and then (b) sending a portion of the dried gas stream to a cooled adsorbent bed containing a first layer of adsorbent to remove sulfur compounds, then sending the dried gas stream to a second layer of adsorbent to remove oxygen and oxygen compounds. An embodiment of the invention is one, any or all of prior embodiments in this paragraph up through the first embodiment in this paragraph wherein the gas stream comprises natural gas. An embodiment of the invention is one, any or all of prior embodiments in this paragraph up through the first embodiment in this paragraph wherein the gas stream has been treated to remove acid gases. An embodiment of the invention is one, any or all of prior embodiments in this paragraph up through the first embodiment in this paragraph wherein there are two adsorbent beds to remove water. An embodiment of the invention is one, any or all of prior embodiments in this paragraph up through the first embodiment in this paragraph wherein after the dried gas stream passes through the cooled adsorbent bed, a gas stream exits the cooled adsorbent bed and is first heated and then passes through an adsorbent bed to heat the adsorbent bed and remove contaminants from the heated adsorbent bed. An embodiment of the invention is one, any or all of prior embodiments in this paragraph up through the first embodiment in this paragraph wherein the heated gas stream exits the adsorbent bed and is then recycled to an acid gas removal unit. An embodiment of the invention is one, any or all of prior embodiments in this paragraph up through the first embodiment in this paragraph wherein the heated gas exits the adsorbent bed and is then recycled to the gas stream. An embodiment of the invention is one, any or all of prior embodiments in this paragraph up through the first embodiment in this paragraph wherein the heated gas exits the adsorbent bed and is then used for a fuel. An embodiment of the invention is one, any or all of prior embodiments in this paragraph up through the first embodiment in this paragraph wherein the cooled adsorbent bed further comprises a layer of adsorbent to remove water or mercury. An embodiment of the invention is one, any or all of prior embodiments in this paragraph up through the first embodiment in this paragraph wherein the cooled adsorbent bed further comprises removal of heavy hydrocarbons. An embodiment of the invention is one, any or all of prior embodiments in this paragraph up through the first embodiment in this paragraph wherein the heavy hydrocarbons are selected from the group consisting of hexane, heptanes and benzene. An embodiment of the invention is one, any or all of prior embodiments in this paragraph up through the first embodiment in this paragraph wherein the first layer of adsorbent to remove sulfur compounds comprises of molecular sieve adsorbent. An embodiment of the invention is one, any or all of prior embodiments in this paragraph up through the first embodiment in this paragraph wherein the layer of adsorbent to remove oxygen comprises a reduced metal oxide adsorbent. An embodiment of the invention is one, any or all of prior embodiments in this paragraph up through the first embodiment in this paragraph wherein the dried gas stream comprises less than about 20 ppmv each of oxygen and sulfur.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:
1. A process for treating a gas stream comprising:
   (a) passing a gas stream through at least one adsorbent bed to remove water and producing a dried gas stream, and then
   (b) sending a portion of said dried gas stream to a cooled adsorbent bed containing a first layer of adsorbent to remove sulfur compounds, then sending said dried gas stream to a second layer of adsorbent to remove oxygen and oxygen compounds.
2. The process of claim 1 wherein said gas stream comprises natural gas.
3. The process of claim 1 wherein said gas stream has been treated to remove acid gases.
4. The process of claim 1 wherein there are two adsorbent beds to remove water.
5. The process of claim 1 wherein after said dried gas stream passes through said cooled adsorbent bed, a gas stream exits said cooled adsorbent bed and is first heated and then passes through an adsorbent bed to heat said adsorbent bed and remove contaminants from said heated adsorbent bed.
6. The process of claim 5 wherein said heated gas stream exits said adsorbent bed and is then recycled to an acid gas removal unit.
7. The process of claim 5 wherein said heated gas exits said adsorbent bed and is then recycled to said gas stream.
8. The process of claim 5 wherein said heated gas exits said adsorbent bed and is then used for a fuel.
9. The process of claim 1 wherein said cooled adsorbent bed further comprises a layer of adsorbent to remove water or mercury.
10. The process of claim 1 wherein said cooled adsorbent bed further comprises removal of heavy hydrocarbons.
11. The process of claim 10 wherein said heavy hydrocarbons are selected from the group consisting of hexane, heptanes and benzene.
12. The process of claim 1 wherein said first layer of adsorbent to remove sulfur compounds comprises of molecular sieve adsorbent.
13. The process of claim 1 wherein said layer of adsorbent to remove oxygen comprises a reduced metal oxide adsorbent.
14. The process of claim 1 wherein said dried gas stream comprises less than about 20 ppmv each of oxygen and sulfur.

* * * * *